United States Patent
Vadali et al.

(10) Patent No.: US 10,315,275 B2
(45) Date of Patent: Jun. 11, 2019

(54) REDUCING SURFACE ASPERITIES

(71) Applicant: Wisconsin Alumni Research Foundation, Madison, WI (US)

(72) Inventors: Venkata Madhukanth Vadali, Madison, WI (US); Chao Ma, Madison, WI (US); Neil Arthur Duffie, Madison, WI (US); Xiaochun Li, Madison, WI (US); Frank Ewald Pfefferkorn, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1533 days.

(21) Appl. No.: 13/749,426

(22) Filed: Jan. 24, 2013

(65) Prior Publication Data
US 2014/0202997 A1 Jul. 24, 2014

(51) Int. Cl.
*B23K 26/00* (2014.01)
*B23K 26/354* (2014.01)
*B23K 26/352* (2014.01)

(52) U.S. Cl.
CPC ........ *B23K 26/354* (2015.10); *B23K 26/3576* (2018.08)

(58) Field of Classification Search
CPC .................. B23K 26/0075; B23K 26/0081; B23K 26/04; B23K 26/08; B23K 26/0066;
(Continued)

(56) References Cited

U.S. PATENT DOCUMENTS 3,914,145 A * 10/1975 Forler ................ C03C 27/10
156/98
4,047,863 A * 9/1977 McCluskey .......... B29C 73/025
156/94
(Continued)

FOREIGN PATENT DOCUMENTS

FR 2977182 A1 * 1/2013 ......... B23K 26/0075

OTHER PUBLICATIONS

M. Vadali et al. "Pulsed Laser Micro Polishing: Surface Prediction Model." ICOMM 2011 No. 80, pp. 331-338 (2011).
(Continued)

*Primary Examiner* — Eric S Stapleton
(74) *Attorney, Agent, or Firm* — Crawford Maunu PLLC

(57) ABSTRACT

Surface asperities, such as roughness characteristics, are reduced or otherwise mitigated via the control of surface regions including the asperities in different regimes. In accordance with various embodiments, the height of both high-frequency and low-frequency surface asperities is reduced by controlling characteristics of a surface region under a first regime to flow material from the surface asperities. A second regime is implemented to reduce a height of high-frequency surface asperities in the surface region by controlling characteristics of the surface region under a second regime to flow material that is predominantly from the high-frequency surface asperities, the controlled characteristics in the second regime being different than the controlled characteristics in the first regime. Such aspects may include, for example, controlling melt pools in each regime via energy pulses, to respectively mitigate/reduce the asperities.

18 Claims, 8 Drawing Sheets

(58) Field of Classification Search
CPC .............. B23Q 15/12; G05B 19/19; G05B 2219/34093; G05B 2219/45165; B23P 9/00; B23P 9/02; B24C 1/10; C21D 7/06; C21D 7/08; C21D 10/00; F01D 5/00; Y10T 29/4932; Y10T 29/476; Y10T 29/479; F05D 2250/60
USPC .................. 219/121.66, 121.11, 162
See application file for complete search history.

(56) References Cited

U.S. PATENT DOCUMENTS

| | | | | |
|---|---|---|---|---|
| 4,613,387 A * | 9/1986 | Turley | ............... | H01L 33/0062 257/E21.117 |
| 4,654,065 A * | 3/1987 | Naumann | ......... | C03B 37/01205 65/477 |
| 4,731,254 A * | 3/1988 | Heineken | ............... | C03B 29/02 219/121.64 |
| 4,731,516 A * | 3/1988 | Noguchi | ............. | H01L 21/2026 117/50 |
| 5,114,528 A * | 5/1992 | Kou | ............... | C30B 13/18 117/202 |
| 5,162,183 A * | 11/1992 | Lindblad | ............... | G03G 5/147 427/74 |
| 5,224,113 A * | 6/1993 | Tsang | ............... | H01S 5/12 372/34 |
| 5,659,479 A * | 8/1997 | Duley | ............... | B23K 26/03 219/121.6 |
| 5,760,379 A * | 6/1998 | Matsen | ............. | B29C 66/73116 219/633 |
| 5,786,576 A * | 7/1998 | Lunden | ............... | B23K 13/02 219/633 |
| 5,902,935 A * | 5/1999 | Georgeson | ......... | G01N 29/2412 73/801 |
| 5,914,059 A * | 6/1999 | Marcin, Jr. | ............. | B23P 6/007 148/525 |
| 5,966,485 A * | 10/1999 | Luther | ............... | B24B 19/226 156/153 |
| 6,023,040 A * | 2/2000 | Zahavi | ............... | B23K 26/0075 219/121.69 |
| 6,024,884 A * | 2/2000 | Bryant | ............... | C23F 1/02 204/192.34 |
| 6,046,426 A * | 4/2000 | Jeantette | ............. | B01F 13/0255 219/121.63 |
| 6,048,255 A * | 4/2000 | Kuo | ............... | G11B 5/8404 360/135 |
| 6,115,400 A * | 9/2000 | Brown | ............... | H01S 3/0615 372/66 |
| 6,122,564 A * | 9/2000 | Koch | ............... | B22F 3/1055 700/123 |
| 6,193,141 B1 * | 2/2001 | Burke | ............... | B23K 20/023 228/190 |
| 6,235,144 B1 * | 5/2001 | Yamamoto | ............... | B08B 7/00 156/247 |
| 6,492,615 B1 * | 12/2002 | Flanagan | ............... | A61F 2/91 219/121.66 |
| 6,508,000 B2 * | 1/2003 | Burke | ............... | B23P 6/005 228/119 |
| 6,541,187 B1 * | 4/2003 | Wang | ............... | G03F 7/0015 430/320 |
| 6,613,169 B2 * | 9/2003 | Georgeson | ......... | G01N 29/2412 156/272.4 |
| 6,724,128 B2 * | 4/2004 | Cheng | ............... | F16C 32/0611 310/323.02 |
| 6,936,951 B1 * | 8/2005 | Cheng | ............... | F16C 32/0611 310/311 |
| 6,971,850 B2 * | 12/2005 | Ganesh | ............... | B21K 1/10 415/216.1 |
| 6,998,568 B2 * | 2/2006 | Brehm | ............... | B23K 1/0056 219/121.62 |
| 7,043,330 B2 * | 5/2006 | Toyserkani | ......... | B23K 26/032 219/121.6 |
| 7,065,872 B2 * | 6/2006 | Ganesh | ............... | B21K 1/10 29/407.05 |
| 7,144,241 B2 * | 12/2006 | Hennessey | ............. | B29C 59/04 425/363 |
| 7,332,369 B2 * | 2/2008 | Veres | ............... | B82Y 10/00 257/E21.299 |
| 7,338,760 B2 * | 3/2008 | Gong | ............... | B01L 3/5027 422/547 |
| 7,358,282 B2 * | 4/2008 | Krueger | ............... | A61L 15/225 521/139 |
| 7,413,832 B2 * | 8/2008 | Koike | ............... | C09G 1/02 427/160 |
| 7,442,629 B2 * | 10/2008 | Mazur | ............... | B23K 26/121 257/E21.131 |
| 7,546,685 B2 * | 6/2009 | Ganesh | ............... | B21K 1/10 29/889 |
| 7,586,061 B2 * | 9/2009 | Hoebel | ............... | B23K 26/032 148/525 |
| 7,635,889 B2 * | 12/2009 | Isa | ............... | H01L 21/288 257/249 |
| 7,737,043 B2 * | 6/2010 | Nishiura | ............ | H01L 21/02008 438/692 |
| 7,884,446 B2 * | 2/2011 | Mazur | ............... | B23K 26/121 257/618 |
| 7,980,000 B2 * | 7/2011 | Lewis | ............... | H01L 21/67028 118/500 |
| 7,985,677 B2 * | 7/2011 | Fujii | ............... | H01L 21/288 438/624 |
| 8,024,846 B2 * | 9/2011 | Luna | ............... | B23P 9/00 29/90.5 |
| 8,133,578 B2 * | 3/2012 | Hatanaka | ............... | H01L 21/486 205/83 |
| 8,205,352 B2 * | 6/2012 | Lewis | ............... | H01L 21/67028 118/500 |
| 8,324,018 B2 * | 12/2012 | Isa | ............... | H01L 21/288 257/72 |
| 8,387,853 B2 * | 3/2013 | Tuppen | ............... | B23P 6/005 219/121.63 |
| 8,400,630 B2 * | 3/2013 | Hemsendorf | ...... | G01N 21/9505 356/239.1 |
| 8,414,267 B2 * | 4/2013 | Ganesh | ............... | B21J 5/002 29/889.2 |
| 8,445,364 B2 * | 5/2013 | Mazumder | ........ | H01L 21/02532 117/3 |
| 8,536,054 B2 * | 9/2013 | Meyer | ............... | B32B 37/02 219/121.66 |
| 8,546,172 B2 * | 10/2013 | Meyer | ............... | B32B 37/02 257/E31.027 |
| 8,789,254 B2 * | 7/2014 | Minisandram | ......... | B21C 23/32 29/424 |
| 8,793,006 B2 * | 7/2014 | Troian | ............... | B81C 1/00031 700/118 |
| 9,044,825 B2 * | 6/2015 | Mokadem | ............. | B23K 26/08 |
| 9,056,368 B2 * | 6/2015 | Stork Genannt Wersborg | ......... | B23K 26/02 |
| 2002/0046998 A1 * | 4/2002 | Hackel | ............... | C03C 15/00 219/121.83 |
| 2002/0126922 A1 * | 9/2002 | Cheng | ............... | F16C 32/0611 384/1 |
| 2002/0185611 A1 * | 12/2002 | Menapace | ............... | B24B 13/00 250/492.1 |
| 2003/0045103 A1 * | 3/2003 | Suzuki | ............... | C30B 25/02 438/689 |
| 2003/0115986 A1 * | 6/2003 | Pozarnsky | ............. | B01D 47/00 75/331 |
| 2003/0115987 A1 * | 6/2003 | Pozarnsky | ............. | B01D 47/00 75/331 |
| 2003/0115988 A1 * | 6/2003 | Pozarnsky | ............. | B01D 47/00 75/331 |
| 2003/0116017 A1 * | 6/2003 | Pozarnsky | ............. | B01D 47/00 95/149 |
| 2003/0116228 A1 * | 6/2003 | Pozarnsky | ............. | B22F 1/0018 148/251 |
| 2003/0127172 A1 * | 7/2003 | Georgeson | ......... | G01N 29/2412 156/64 |

(56) References Cited

U.S. PATENT DOCUMENTS

| | | | |
|---|---|---|---|
| 2003/0138941 A1* | 7/2003 | Gong | B01L 3/5027 435/287.2 |
| 2003/0205831 A1* | 11/2003 | Rawlins | B29C 73/025 264/36.21 |
| 2004/0033006 A1* | 2/2004 | Farah | G02B 6/138 385/14 |
| 2004/0123796 A1* | 7/2004 | Nagai | C30B 25/02 117/103 |
| 2004/0154646 A1* | 8/2004 | Hong | B29C 73/34 134/19 |
| 2004/0185238 A1* | 9/2004 | Kawamura | B32B 23/12 428/221 |
| 2004/0241966 A1* | 12/2004 | Koike | C30B 25/02 438/483 |
| 2005/0040147 A1* | 2/2005 | Hoebel | B23K 26/032 219/121.64 |
| 2005/0091832 A1* | 5/2005 | Ganesh | B21K 1/10 29/527.6 |
| 2005/0095137 A1* | 5/2005 | Ganesh | B21K 1/10 416/244 A |
| 2005/0124709 A1* | 6/2005 | Krueger | A61L 15/225 521/50 |
| 2005/0238493 A1* | 10/2005 | Ganesh | B21K 1/10 416/244 A |
| 2005/0242059 A1* | 11/2005 | Brennen | B23K 26/0084 216/41 |
| 2006/0023758 A1* | 2/2006 | Wang | H01S 3/109 372/22 |
| 2006/0030632 A1* | 2/2006 | Krueger | A61L 15/225 521/50 |
| 2006/0079062 A1* | 4/2006 | Mazur | B23K 26/121 438/308 |
| 2006/0081571 A1* | 4/2006 | Hoebel | B23K 26/032 219/121.64 |
| 2006/0108334 A1* | 5/2006 | Frietsch | H01H 11/041 219/121.64 |
| 2006/0115983 A1* | 6/2006 | Fujii | H01L 21/288 438/640 |
| 2006/0170111 A1* | 8/2006 | Isa | H01L 21/288 257/775 |
| 2007/0128905 A1* | 6/2007 | Speakman | H05K 1/0265 439/161 |
| 2007/0138150 A1* | 6/2007 | Gualtieri | B23K 26/0096 219/121.63 |
| 2007/0175030 A1* | 8/2007 | Luna | B23P 9/00 29/889.2 |
| 2007/0213443 A1* | 9/2007 | Fine | C09D 7/02 524/366 |
| 2007/0269989 A1* | 11/2007 | Nishiura | H01L 21/02008 438/718 |
| 2007/0281088 A1* | 12/2007 | Rutz | B23P 6/002 427/250 |
| 2008/0216924 A1* | 9/2008 | Schumacher | C22C 23/00 148/538 |
| 2008/0314878 A1* | 12/2008 | Cai | B22F 3/1055 219/121.62 |
| 2009/0014842 A1* | 1/2009 | Mazur | B23K 26/121 257/618 |
| 2009/0038166 A1* | 2/2009 | Crichton | B26B 19/044 30/346.51 |
| 2009/0084413 A1* | 4/2009 | Lewis | H01L 21/67028 134/30 |
| 2009/0166079 A1* | 7/2009 | Hatanaka | H01L 21/486 174/262 |
| 2009/0188899 A1* | 7/2009 | Bouchut | C03B 25/00 219/121.61 |
| 2009/0220864 A1* | 9/2009 | Tanabe | G03F 1/84 430/5 |
| 2009/0255102 A1* | 10/2009 | McMasters | B23P 6/007 29/402.18 |
| 2009/0255116 A1* | 10/2009 | McMasters | B23P 6/007 29/889.1 |
| 2009/0256007 A1* | 10/2009 | McMasters | B23P 6/007 239/463 |
| 2009/0297395 A1* | 12/2009 | Mazumder | H01L 21/02532 420/556 |
| 2010/0099217 A1* | 4/2010 | Isa | H01L 21/288 438/104 |
| 2010/0145491 A1* | 6/2010 | Troian | B81C 1/00031 700/98 |
| 2010/0218827 A1* | 9/2010 | Aono | C25D 11/02 136/264 |
| 2010/0236627 A1* | 9/2010 | Yago | H01L 31/0749 136/261 |
| 2010/0252110 A1* | 10/2010 | Yago | H01L 31/0749 136/261 |
| 2010/0258542 A1* | 10/2010 | Meyer | B32B 37/02 219/121.66 |
| 2010/0258982 A1* | 10/2010 | Meyer | B32B 37/02 264/446 |
| 2011/0030772 A1* | 2/2011 | Veerasamy | B82Y 30/00 136/256 |
| 2011/0030879 A1* | 2/2011 | Veerasamy | B82Y 30/00 156/99 |
| 2011/0030991 A1* | 2/2011 | Veerasamy | C30B 29/02 174/126.1 |
| 2011/0031226 A1* | 2/2011 | Mokadem | B23K 26/08 219/121.64 |
| 2011/0033688 A1* | 2/2011 | Veerasamy | C30B 25/02 428/220 |
| 2011/0076147 A1* | 3/2011 | Ganesh | B21J 5/002 416/204 R |
| 2011/0121206 A1* | 5/2011 | Mazur | B23K 26/121 250/492.2 |
| 2011/0143045 A1* | 6/2011 | Veerasamy | B82Y 30/00 427/495 |
| 2011/0174786 A1* | 7/2011 | Lefebvre | B23K 26/08 219/121.64 |
| 2011/0180589 A1* | 7/2011 | Tuppen | B23P 6/005 228/104 |
| 2011/0207328 A1* | 8/2011 | Speakman | H01L 51/0016 438/694 |
| 2011/0266736 A1* | 11/2011 | Lewis | H01L 21/67028 269/315 |
| 2011/0278277 A1* | 11/2011 | Stork Genannt Wersborg | B23K 26/02 219/209 |
| 2011/0284512 A1* | 11/2011 | Stork Genannt Wersborg | B23K 26/02 219/121.72 |
| 2012/0015112 A1* | 1/2012 | Yang | H05K 3/105 427/555 |
| 2012/0145669 A1* | 6/2012 | Tashiro | B41C 1/05 216/54 |
| 2012/0180526 A1* | 7/2012 | Cormont | B23K 26/0021 65/29.1 |
| 2012/0183708 A1* | 7/2012 | Minisandram | B21C 23/32 428/34.6 |
| 2012/0225773 A1* | 9/2012 | Krueger | A61L 15/225 502/402 |
| 2012/0237745 A1* | 9/2012 | Dierkes | A61K 6/0215 428/215 |
| 2013/0084428 A1* | 4/2013 | Hayashi | G03G 15/0233 428/141 |
| 2013/0200053 A1* | 8/2013 | Bordatchev | B23K 26/04 219/121.78 |
| 2014/0113528 A1* | 4/2014 | Cormont | B23K 26/0075 451/6 |
| 2014/0290321 A1* | 10/2014 | Minisandram | B21C 23/32 72/46 |

OTHER PUBLICATIONS

M. Vadali et al. "Effects of Laser Pulse Duration on Pulse Laser Micro Polishing." ICOMM 2012, No. 112, pp. 291-297 (2012).

T. Perry et al. "Pulsed laser polishing of micro-milled Ti6A14V samples." J. of Manufactur. Processes 11(2), pp. 74-81 (2009).

(56) References Cited

OTHER PUBLICATIONS

A. M. Khalid Hafiz et al. "Influence of overlap between the laser beam tracks on surface quality in laser polishing of AISI H13 tool steel." J. of Manufactur. Processes 14(4), pp. 425-434 (2012).

M. T.C. Chow et al. "Experimental Statistical Analysis of Laser Micropolishing Process." Int'l Symposium ISOT 2010, 6 pgs. (2010).

E. Willenborg et al. "Polishing by laser radiation." Proceed. of the 2nd Int'l WLT—Conf. on Lasers in Manufacturing, pp. 297-300 (2003).

C. Nüsser et al. "Influence of Intensity Distribution and Pulse Duration on Laser Micro Polishing." Physics Procedia 12, pp. 462-471 (2011).

A. Temmler et al. "Design Surfaces by Laser Remelting." Physics Procedia 12, p. 419-429 (2011).

Martan, J., Cibulka, O., and Semmar, N., 2006, "Nanosecond Pulse Laser Melting Investigation by IR Radiometry and Reflection-based Methods," Applied Surface Science, 253(3), pp. 1170-1177.

Pendleton, W. E., Williams, G. P., Williams, R. T., Wu, J. C., Cvijanovich, G. B., Joyce, J. L., and McCleaf, M., 1993, "Scanning Tunneling Microscopy of Nickel Surface Features Before and After Rapid Melting by Excimer Laser," AMP Journal of Technology, 3, pp. 75-84.

Lamikiz, A., Sanchez, J. A., de Lacalle, L. N. L., del Pozo, D., and Etayo, J. M., 2006, "Surface roughness improvement using laser-polishing techniques," Advances in Materials Processing Technologies, 526, pp. 217-222.

Ramos-Grez, J. A., and Bourell, D. L., 2004, "Reducing Surface Roughness of Metallic Freeform-Fabricated Parts Using Non-Tactile Finishing Methods," International Journal of Materials & Product Technology, 21(4), pp. 297-316.

Marella, P. F., Tuckerman, D. B., and Pease, R. F., 1989, "Modeling of Laser Planarization of Thin Metal-Films," Applied Physics Letters, 54(12), pp. 1109-1111.

Tuckerman, D. B., and Weisberg, A. H., 1986, "Planarization of Gold and Aluminum Thin-Films using a Pulsed Laser," IEEE Electron Device Letters, 7(1), pp. 1-4.

Temmler, A., Graichen, K., and Donath, J., 2010, "Laser Polishing in Medical Engineering; Laser Polishing of Components for Left Ventricular Assist Devices," Laser Technik Journal, 7(2), pp. 53-57.

Bereznai, M., Pelsoczi, I., Toth, Z., Turzo, K., Radnai, M., Bor, Z., and Fazekas, A., 2003, "Surface Modifications Induced by ns and sub-ps Excimer Laser Pulses on Titanium Implant Material," Biomaterials, 24(23), pp. 4197-4203.

Kim, Y. G., Ryu, J. K., Kim, D. J., Kim, H. J., Lee, S., Cha, B. H., Cha, H., and Kim, C. J., 2004, "Microroughness Reduction of Tungsten Films by Laser Polishing Technology with a Line Beam," Japanese Journal of Applied Physics Part 1—Regular Papers Short Notes & Review Papers, 43(4A), pp. 1315-1322.

Perry, T. L., Werschmoeller, D., Li, X. C., Pfefferkorn, F. E., and Duffie, N. A., 2009, "The Effect of Laser Pulse Duration and Feed Rate on Pulsed Laser Polishing of Microfabricated Nickel Samples," Journal of Manufacturing Science and Engineering—Transactions of the ASME, 131(3).

Perry, T. L., Werschmoeller, D., Duffie, N. A., Li, X. C., and Pfefferkorn, F. E., 2009, "Examination of Selective Pulsed Laser Micropolishing on Microfabricated Nickel Samples Using Spatial Frequency Analysis," Journal of Manufacturing Science and Engineering—Transactions of the ASME, 131(2).

Bagno, A., Genovese, M., Luchini, A., Dettin, M., Conconi, M. T., Menti, A. M., Parnigotto, P. P., and Di Bello, C., 2004, "Contact Profilometry and Correspondence Analysis to Correlate Surface Properties and Cell Adhesion in Vitro of Uncoated and Coated Ti and Ti6Al4V disks," Biomaterials, 25(12), pp. 2437-2445.

Borsari, V., Giavaresi, G., Fini, M., Torricelli, P., Salito, A., Chiesa, R., Chiusoli, L., Volpert, A., Rimondini, L., and Giardino, R., 2005, "Physical Characterization of Different-Roughness Titanium Surfaces, with and without Hydroxyapatite Coating, and Their Effect on Human Osteoblast-like Cells," Journal of Biomedical Materials Research Part B—Applied Biomaterials, 75B(2), pp. 359-368.

Khang, D., Lu, J., Yao, C., Haberstroh, K. M., and Webster, T. J., 2008, "The Role of Nanometer and Sub-micron Surface Features on Vascular and Bone Cell Adhesion on Titanium," Biomaterials, 29(8), pp. 970-983.

Ponsonnet, L., Reybier, K., Jaffrezic, N., Comte, V., Lagneau, C., Lissac, M., and Martelet, C., 2003, "Relationship between Surface Properties (Roughness, Wettability) of Titanium and Titanium Alloys and Cell Behaviour," Materials Science & Engineering C—Biomimetic and Supramolecular Systems, 23(4), pp. 551-560.

ISO, 2006, "ISO 11554:2006, Optics and photonics—Lasers and Laser-Related Equipment—Test Methods for Laser Beam Power, Energy and Temporal Characteristics."

ISO, 2011, "ISO 16610-21, Geometrical Product Specifications (GPS)—Filtration—Part 21: Linear profile filters: Gaussian filters."

Heiple, C. R., and Roper, J. R., 1982, "Mechanism for Minor Element Effect on GTA Fusion Zone Geometry," Welding Journal, 61(4), pp. 97s-102s.

Kou, S., Limmaneevichitr, C., and Wei, P. S., 2011, "Oscillatory Marangoni Flow: A Fundamental Study by Conduction-Mode Laser Spot Welding," Welding Journal, 90, pp. 229s-240s.

* cited by examiner

REDUCING SURFACE ASPERITIES

FEDERALLY SPONSORED RESEARCH OR DEVELOPMENT

This invention was made with government support under 090004 awarded by the National Science Foundation. The government has certain rights in the invention.

FIELD

Aspects of the present invention relate generally to the polishing of materials, and more specific aspects relate to reducing surface asperities via the application of different regimes for polishing.

BACKGROUND

Various materials such as metals, metal alloys and others can exhibit surface asperities such as rough features that are desirably smoothed. Many approaches have been implemented to reducing (the height of) surface asperities. Mechanical polishing has been used to physically remove material in the asperities. Non-contact polishing such as continuous-wave (CW) laser polishing and pulsed laser polishing (PLP) have also been used to reduce the surface roughness of metals and other materials. In CW laser polishing, portions of the surface are melted as the laser is scanned across the surface, and material can flow from asperities in the melted portions. In PLP, laser pulses irradiate the surface, melting the surface in a small area with each pulse. In these molten areas, surface asperities (protrusions from the surface) are regions of high surface tension and are thus "pulled down" in order to create lower surface tension. If this happens before resolidification, the resulting surface is smoother.

While these approaches have been useful, many aspects have remained challenging. For example, mechanical polishing removes material, which can be undesirable or wholly impractical. In CW polishing, melt depths and heat affected depths of 100s of microns can raise issues with underlying materials or components, and may not be suitable for devices with dimensions measured in 10s to 100s of microns. While PLP can provide better control of the melt depth and the resulting heat affected zone (HAZ), surface asperities remaining after polishing can be undesirably large.

These and other problems have been challenging to the reduction of surface asperities, and to doing so in microscale devices.

SUMMARY

Various aspects of the present invention are directed to polishing or otherwise reducing surface asperities, such as those relating to rough surface features of a material.

In accordance with various embodiments, surface asperities in a material such as a metal or metal alloy are reduced in height (e.g., size) by applying energy under first and second regimes having different operating characteristics. In the first regime, the height of surface asperities is reduced for a material surface region having both high-frequency and low-frequency surface asperities, by controlling characteristics of the surface region to flow material from the surface asperities. In the second regime, the height of high-frequency surface asperities is reduced in the material surface region, by controlling characteristics of the surface region to flow material that is predominantly from the high-frequency surface asperities. In some implementations, the second regime operates to reduce high-frequency surface asperities generated during the first regime.

A more specific example embodiment is directed to reducing the height of both high-frequency surface and low-frequency surface asperities in a surface region of a material using thermocapillary flow under a first regime, and one or both of thermocapillary and capillary flow under a second regime. In the first regime, energy pulses are used to generate melt pools in the surface region, and to promote thermocapillary flow of the material from the surface asperities in the melt pools. Additional high-frequency asperities are generated near edges of the melt pools as the melt pools solidify. The height of these additional high-frequency surface asperities is reduced under the second regime by applying different energy pulses to generate melt pools in the surface region. At least one of thermocapillary and capillary flow of the material is promoted, to remove and/or rearrange material from the additional high-frequency surface asperities.

In some implementations, the second regime operates by first implementing thermocapillary flow using a temperature gradient or other melt pool condition that is lower than that of the first regime, from a heating perspective. Thereafter, capillary flow is used to further reduce the height of additional surface asperities generated during one or both of the thermocapillary flow conditions.

Another example embodiment is directed to an apparatus including an energy pulse device that applies energy pulses to a surface region of a material, and a controller that controls the energy pulse device to generate and use respective energy pulses as follows. First energy pulses are generated to reduce a height of surface asperities in the surface region by controlling characteristics of the surface region to flow material from both high-frequency and low-frequency surface asperities therein. The second energy pulses are used to reduce a height of high-frequency surface asperities in the surface region by controlling characteristics of the surface region to flow material, from the surface region, that is predominantly from the high-frequency surface asperities. The first and second energy pulses are implemented using different characteristics to promote the respective types of flow for reducing the asperities.

The above summary is not intended to describe each embodiment or every implementation of the present invention. The figures and detailed description that follow more particularly exemplify various embodiments.

DESCRIPTION OF THE FIGURES

Aspects of the invention may be more completely understood in consideration of the following detailed description of various embodiments in connection with the accompanying drawings, in which.

Figure 1:
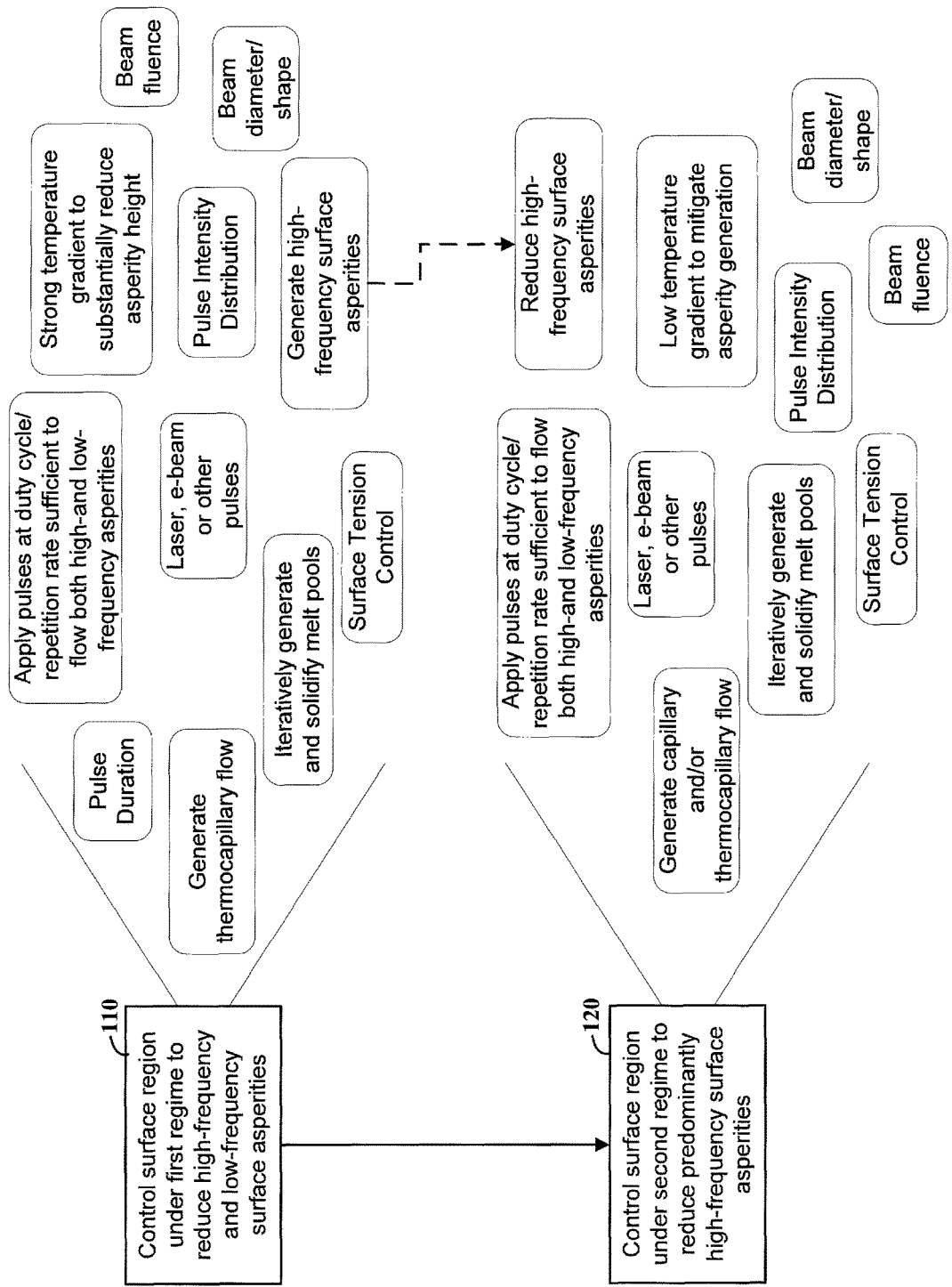
FIG. 1 is a flow diagram for reducing surface asperities, in accordance with one or more example embodiments.

While various embodiments of the invention are amenable to modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

DETAILED DESCRIPTION

Various aspects of the present invention are directed to polishing a material surface region. While the present invention is not necessarily limited as such, various aspects may be appreciated through a discussion of examples using this context.

In connection with various example embodiments, a multiple-pass, pulsed energy polishing approach uses differing parameters to effect different polishing regimes for a surface region of a material. Operating conditions are varied from one polishing pass to the next, to reduce asperities (e.g., rough surface features) across a broad range of frequencies, and subsequently to reduce high-frequency asperities such as asperities generated during an earlier pass (e.g., as generated via high temperature gradient/thermocapillary flow). Such a subsequent pass or passes can be implemented using a lower temperature gradient, thus mitigating the introduction of asperities while reducing the height of existing asperities. This subsequent-pass approach can be effected, for example, using a capillary flow regime, or a regime involving a combination of capillary and thermocapillary flow.

As discussed herein, thermocapillary flow (e.g., Marangoni flow) is effected via the surface tension of a material as related to temperature and temperature gradients in melt pools generated therein. The melt pools are created during the application of pulsed energy, such as a pulsed laser polishing (PLP) process, which generates higher temperatures at a center of the melt pool where an energy beam such as a laser beam or electron beam, is focused. These temperature gradients generate lateral flow of the material that reduces asperities, but may also generate surface asperities. For instance, flowing material to an edge of a melt pool having regions of highest surface tension can generate an upwelling of material at these edges as the melt pool resolidifies.

As also discussed herein, a capillary regime is effected by controlling characteristics of a melt pool such that surface tension gradient thermocapillary flows are negligible, such as by maintaining a static-type condition with little or no lateral flow of the material. Thermocapillary flows are thus negligible when melt durations are short and the temperature gradient is relatively small. Accordingly, a capillary regime can be implemented using energy pulses of a duty cycle/repetition rate that results in shorter pulses than a duty cycle/repetition rate that generates thermocapillary flow, such that molten rough surface features in the melt pool at regions of relatively high surface tension oscillate as stationary capillary waves as material flows therefrom. The amplitudes of these oscillations, as related to the heights of asperities (e.g., roughness features, curvature), damp out before resolidification due to the viscosity of the molten metal. This approach is used to achieve a smoother surface, relative to the surface before capillary flow. Flow in the capillary regime is effective in smoothing high-frequency spatial frequency features (e.g., above what can be referred to as a "critical frequency"), yet not having a significant effect on low frequency or long wavelength features.

For general information regarding capillary flow, and for specific information regarding an asperity "critical" frequency above which the capillary regime can be effective and the determination thereof for specific materials, reference may be made to Vadali, M, Ma, C., Duffle, N. A., Li, X, and Pfefferkorn, "Pulsed Laser Micro Polishing: Surface Prediction Model," SME Journal of Manufacturing Technology, 14, pp. 307-315 (2012), which is fully incorporated herein by reference. In some embodiments, the integrated fluid flow and heat transfer model described in this Vadali reference are implemented to predict a surface finish achievable by pulsed laser polishing using approaches as discussed herein. The surface topography is transformed into spatial Fourier components that, once molten, oscillate as stationary capillary waves and facilitate the flow of material from high-frequency surface asperities. In this context, a critical frequency ($f_{cr}$) is a function of the duration of the molten state as:

$$f_{cr} = \left(\frac{\rho}{8\pi^2 \mu t_m}\right)^{1/2},$$

where $\rho$ is the density of the molten material, $\mu$ is the dynamic viscosity of the molten material, and $t_m$ is the melt duration. The amplitude of the spatial frequency component $f_x$, $f_y$ at the end of the melt duration is given as:

$$\zeta(f_x, f_y)_{polished} = \zeta(f_x, f_y)_{unpolished} e^{-\left[\left(\frac{f_x}{f_{cr}}\right)^2 + \left(\frac{f_y}{f_{cr}}\right)^2\right]}$$

As implemented in accordance with various embodiments, the surface finish is set via the surface melt duration, which is governed by the pulse duration and the material properties. With longer pulses, the surface of a given material is molten for a longer time. This gives more time for the oscillations to damp out and a smoother finish can be achieved.

In connection with the above discussion and one or more embodiments, it has been recognized/discovered that the use of such a capillary regime, in combination with (and after) using a thermocapillary regime to flow surface asperities, can be beneficial for reducing a broad frequency range of asperities while also reducing residual/generated asperities present after the thermocapillary regime has been carried out. For instance, pulsed energy polishing at relatively long melt durations in the thermocapillary regime is used to not only reduce the amplitudes of high spatial frequency asperities features, but also to significantly reduce the amplitudes of lower spatial frequency (i.e., long wavelength) asperities. Such thermocapillary flow may introduce a feature (e.g., circular for a circular beam shape) onto the surface by each pulse due to the flow of liquid metal to the edges (e.g., in materials such as Ti6Al4V). When overlapping pulses are used in the thermocapillary regime, a surface ripple is created having a spatial frequency equal to the number of laser pulses per mm. The capillary regime can then be used to reduce these ripple asperities introduced in the thermocapillary regime.

Turning now to the figures, FIG. 1 shows a flow diagram for reducing surface asperities, in accordance with one or more example embodiments. First and second material flow regimes are respectively implemented at blocks 110 and 120. These flow regimes may be implemented in accordance with one or more embodiments herein. Referring to block 110, a surface region of a workpiece is controlled to reduce both high-frequency and low-frequency asperities. This approach may involve, for example, controlling a surface region by iteratively generating and solidifying melt pools, and therein facilitating flow in the material that reduces the height (e.g., and size) of surface asperities. As shown to the right of block 110, this can be achieved by a combination of one or more control aspects, including these and/or controlling the intensity distribution of the energy pulses in the surface region, controlling beam shape/size, controlling beam fluence, generating thermocapillary flow, using strong temperature gradients, using an energy beam with a specific duty cycle/repetition rate to control the melt pool (e.g., and temperature gradients/flow type), controlling surface tension, and using different types of energy beams. Further, this approach can generate high frequency surface asperities under the first regime.

Referring to block 120, the surface region is again controlled, but differently this time, to effect a different type of flow in generated melt pools that predominantly reduces high-frequency surface asperities. As is similar to that shown with block 110, to the right of block 120 is shown a variety of aspects that may be implemented with the second regime. For example, the duty cycle/repetition rate of applied pulses can be tailored to adjust pulse duration and the related generation of melt pools (e.g., for a lesser amount of time, or more time in-between) and mitigate high frequency asperities, while mitigating asperity generation. For a set pulse duration, the repetition rate or duty cycle can be used to control the time between pulses in order to allow the melt pool to resolidify, and to allow heat to diffuse into the bulk of the workpiece (e.g., and bring the surface temperature closer to an initial temperature prior to pulse application). Accordingly, relatively lower temperature gradients can be used to achieve flow, yet without generating significant asperities as may be effected via thermocapillary flow in the first regime at block 110. This flow can be achieved using capillary and/or thermocapillary flow, and may involve multiple steps beginning with thermocapillary flow at a lower temperature gradient than in block 110, followed by capillary flow, to achieve a desired surface roughness (smooth).

The respective regimes can be effected using one or more of a variety of approaches, such as via the control of characteristics of an energy beam applied, and via the use of surface components and/or dopants at the material that influence flow. For a given material, different melt durations for the respective regimes can be produced by manipulating one or more of the incident power, beam size, beam shape, pulse duration and time between pulses.

In some embodiments, characteristics of a surface region are controlled based upon the type of feature in the surface region. In accordance with one such embodiment, energy pulses are generated based upon a type of surface feature in the surface region, such as by modeling an expected flow of material from the specific type of surface feature and tailoring the pulses to that type of feature. The energy pulses are used to reduce a height of surface features of the type in the surface region. Such an approach may, for example, include controlling energy profile aspects of applied energy to suit the particular type of surface feature, such as by controlling beam shape, energy level, pulse duration, time between pulses and others as discussed herein.

In various embodiments, a surface region is controlled by setting a first surface tension condition that varies along the surface region and using the first surface tension condition to promote the flow of the material under the first regime. A second surface tension condition that is different than the first surface tension condition is set in the surface region for the second regime. This approach may be effected by or in connection with setting a temperature gradient, or with second surface tension conditions that vary or that are stationary across a surface. In some implementations, setting a surface tension condition includes using one or both of a dopant at the surface region and a surface-active agent located at (e.g., on) a surface of the surface region. For general information regarding surface characteristics, and for specific information regarding the user of surface-active agents for influencing surface characteristics and Marangoni flow as may be implemented in connection with one or more embodiments, reference may be made to Kou, et al., "Oscillatory Marangoni Flow: A Fundamental Study by Conduction-Mode Laser Spot Welding," *Welding Journal* (December 2011), which is fully incorporated herein by reference.

Figure 3A:
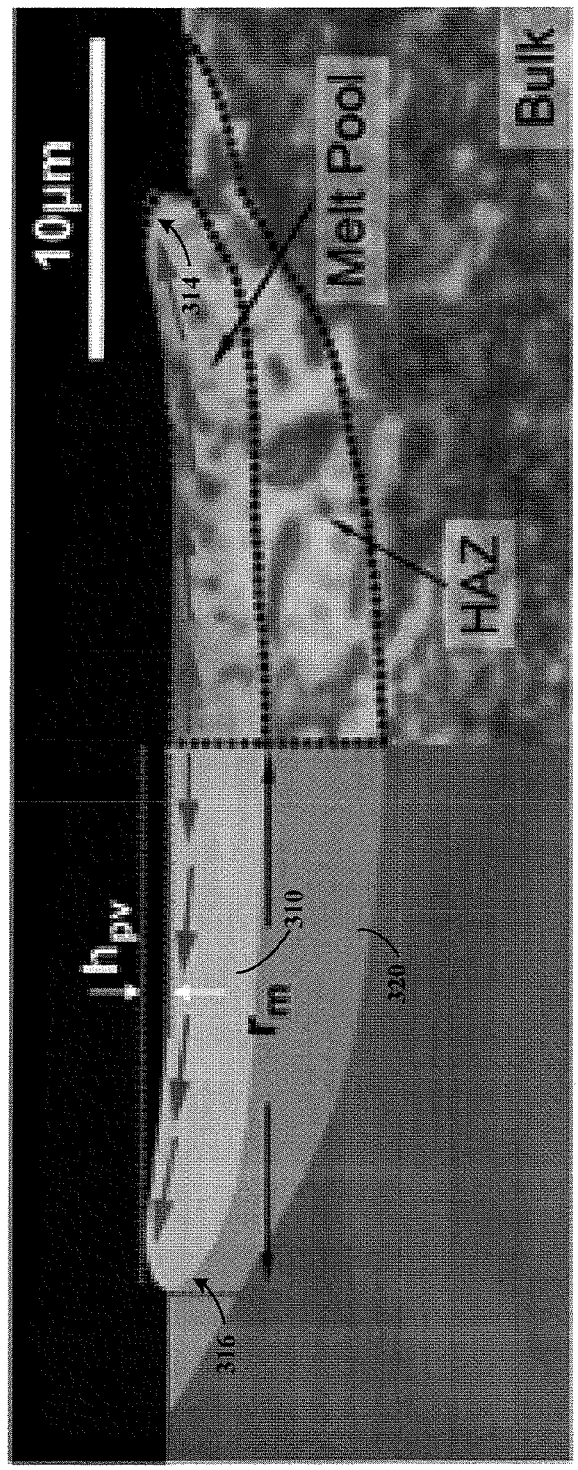
FIG. 3A shows an approach for reducing a height of surface asperities in a first regime involving thermocapillary flow, in accordance with one or more example embodiments.
Figure 3B:
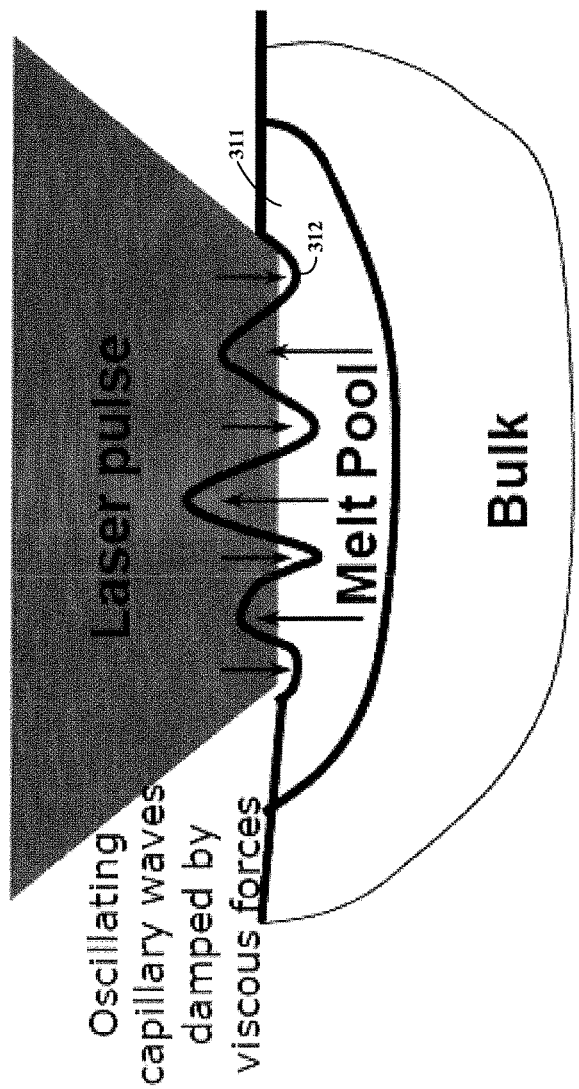
FIG. 3B shows an approach for reducing a height of surface asperities in a second regime involving capillary flow, in accordance with one or more example embodiments.

In more specific embodiments, the first regime is effected by promoting thermocapillary flow, and the second regime is effected by promoting capillary flow. The first regime involves generating high-frequency asperities, such as shown in FIG. 3A. The second regime involves reducing the generated high-frequency asperities by flowing material therefrom, via the generation of a melt pool under capillary flow conditions that do not promote lateral flow. This can be carried out as shown in FIG. 3B.

In other embodiments, the first regime is carried out by generating melt pools having a highest temperature at a center portion thereof and a first temperature gradient extending from the center portion to an edge of the melt pool. This temperature gradient is used to flow materials from high and low-frequency asperities and upwells material via thermocapillary flow as the melt pools resolidify to generate additional high-frequency asperities. This is carried out in each of a plurality of overlapping regions in the surface material, with each region corresponding to one of the energy pulses. In the second regime, energy pulses are applied to generate melt pools having a second temperature gradient from a center portion to an edge thereof that is smaller than the first temperature gradient and that mitigates upwelling of material. Viscous characteristics of the material are used in the second regime to damp oscillations of the material in the melt pools as the melt pools resolidify.

In some implementations, the melt pools are generated for a first duration in the first regime, before resolidifying the melt pools. This first duration is sufficient to reduce a majority of the height of the high and low frequency asperities to smooth a surface of the surface region (e.g., over 50%, or 70% of the height). The melt pools are maintained for a second duration before resolidifying of the melt pools in the second regime. This second duration is different than the first duration and sufficient to reduce the majority of the height of the additional high-frequency asperities, thereby additionally smoothing the surface of the surface region.

One or more parameters are used to control the application of energy to effect material flow in the respective regimes, in accordance with various embodiments. Such example parameters include the following:

1. Absolute peak-to-valley height, $h_{pv}$ (e.g., either estimated from a model or experimentally measured), can be used as a potential distinguishing parameter. If $h_{pv}<h_{threshold}$ (a threshold height), the operation is in capillary regime, or otherwise in a thermocapillary regime. The threshold height can be chosen as:
   a. The resolution of the measurement device
   b. The average surface roughness of the resultant surface
2. An average feature slope, $\delta_f$ is the ratio of peak-to-valley height ($h_{pv}$) of the feature resulting from thermocapillary flows to the radius of a melt pool ($r_m$):

$$\delta_f = \frac{h_{pv}}{r_m} \quad (1)$$

3. A surface prediction model deviates significantly in the thermocapillary regimes, which can be used to distinguish between capillary and thermocapillary regimes.

These respective parameters may be set to suit particular types of material, and then used to control the flow in a surface region of the material via the generation of melt pools as discussed herein. In one embodiment, a multi-pass approach includes a first pass that achieves a reduction in surface roughness by operation in a thermocapillary regime. The parameters for one or more successive passes are chosen such that the value of a distinguishing parameter (e.g., as discussed above) is smaller than the parameter value corresponding to the previous pass. In certain embodiments, a successive pass is effected via the thermocapillary regime at operational conditions that reduce asperities remaining after a first thermocapillary pass, and a further pass is carried out in the capillary regime to smoothen/remove residual processing features from the previous pass.

In some embodiments, near-infrared laser pulses are used to polish a material with different pulse durations. The material is heated under a first regime using relatively long pulse durations to generate movement of portions of the material via predominantly thermocapillary flows (e.g., Marangoni convective flows). The material is also heated under a second regime using shorter pulse durations in which one or both of thermocapillary and capillary flow is effected to further reduce asperities remaining after the first regime, and including asperities generated during the first regime (e.g., by using relatively lower temperature gradients with thermocapillary and/or capillary flow in the second regime).

The approaches discussed herein may be used in a variety of manners, such as by tooling makers in industries including metal cutting bits, as well as plastic injection mold tooling makers. This can be used for micro-fabricated and micro-milled parts, where surface roughness approaches feature size, such as those in the medical, aerospace, and electronics industries. Accordingly, these non-contact approaches are not only amenable to implementation with macro-scale polishing applications, but also to micro-scale polishing as facilitated via the ability to direct an energy beam to small features. These approaches can be carried out while producing very little debris and/or removing very little material (e.g., negligible ablation), which also facilitates the polishing of features with very tight dimensional tolerances. Further, these approaches can be carried out with a variety of materials, such as one or more of including nickel, aluminum, steel, tool steel, and stainless steel, as well as alloys thereof.

Figure 2:
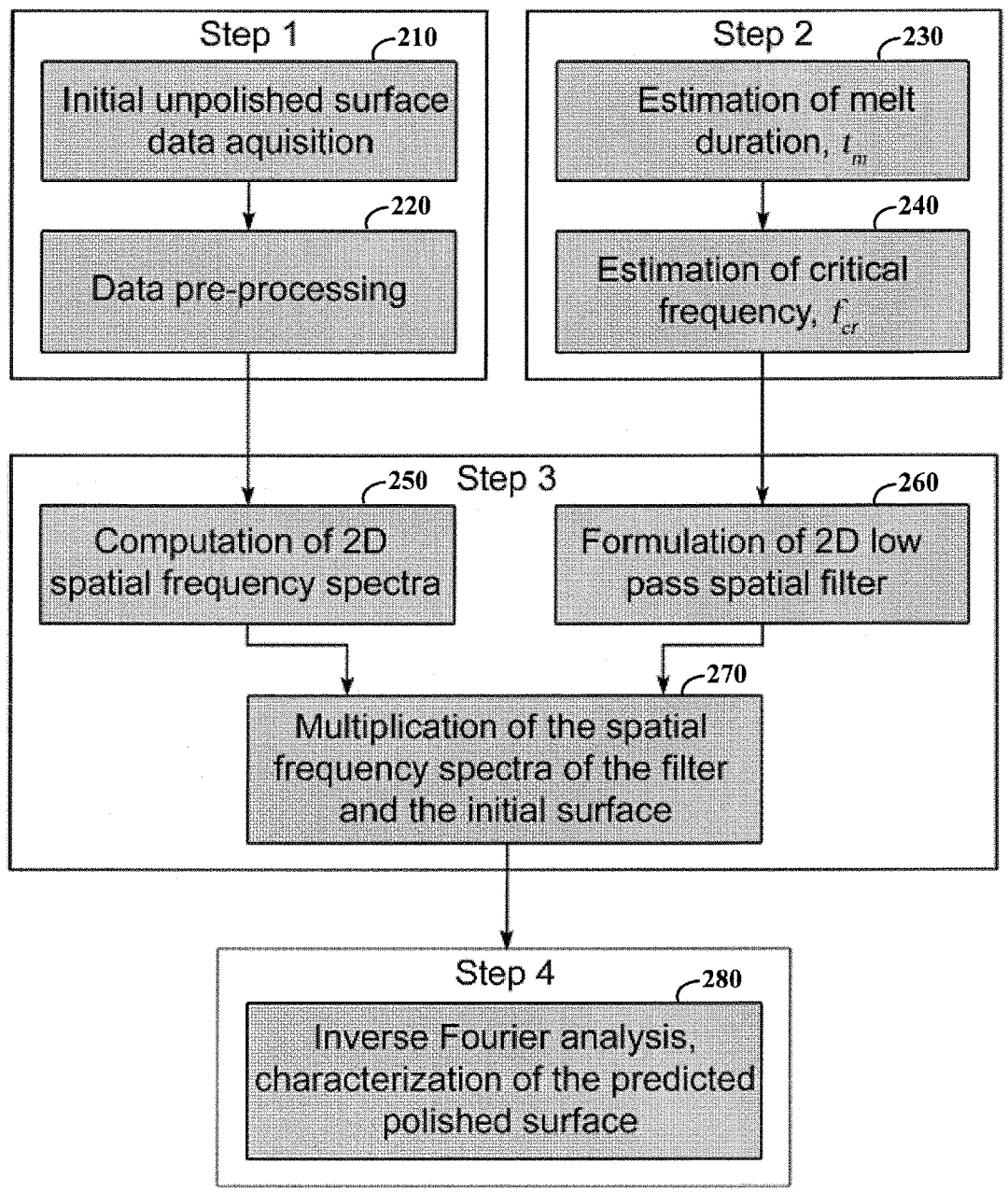
FIG. 2 is another flow diagram for use in reducing surface asperities, in accordance with one or more example embodiments.

FIG. 2 is another flow diagram for use in reducing surface asperities, in accordance with one or more example embodiments. This approach may, for example, be used to determine conditions of the application of energy pulses to reduce surface asperities, as described herein. Further, this approach may be implemented in accordance with one or more approaches as described in the Vadali reference, discussed above.

A first step is carried out in which data is acquired for an unpolished surface at block 210, and data pre-processing is carried out at block 220. In a second step, melt duration is estimated at block 230, and a critical frequency is estimated at block 240. In a third step, two-dimensional spatial frequency spectra are calculated at block 250, using the pre-processed data from block 220. Also in the third step, a two-dimensional low-pass spatial filter is formulated and implemented at block 260 with the estimated critical frequency, and the spatial frequency spectra of the initial surface data (from block 250 and filter (from block 260) are multiplied at block 270. An inverse Fourier analysis is carried out at block 280 in a fourth step, in which the predicted polished surface is characterized.

In some implementations, a two-dimensional numerical axisymmetric heat transfer model is used to estimate melt durations at block 230, and used to compute the corresponding critical frequencies at block 240. The time for which the surface is molten depends on the time history (duration) and magnitude of laser pulse energy incident on it. The laser pulse energy in the model, for a given pulse duration, is chosen to be slightly less than that required for ablation to mitigate material loss. Example estimated maximum melt durations and critical frequencies are listed in Table 1 below.

FIG. 3A shows an approach for reducing a height of surface asperities in a first regime involving thermocapillary flow, in accordance with one or more example embodiments. Further, FIG. 3B shows an approach for reducing a height of surface asperities in a second regime involving capillary flow, as can be implemented with FIG. 3A. Beginning with FIG. 3A, thermocapillary flow is introduced in a surface region of a material, with a melt pool generated at 310 and a HAZ region below at 320. The thermocapillary flow (represented by arrows) directs material toward edges of the melt pool, reducing the height of surface asperities and resulting in upwelling as shown at 314 and 316. As shown in FIG. 3B, the second regime is implemented to generate a melt pool 311 and flow material via oscillating capillary waves 312. These capillary waves work to reduce the height of high-frequency surface asperities remaining after the first regime.

Figure 4:
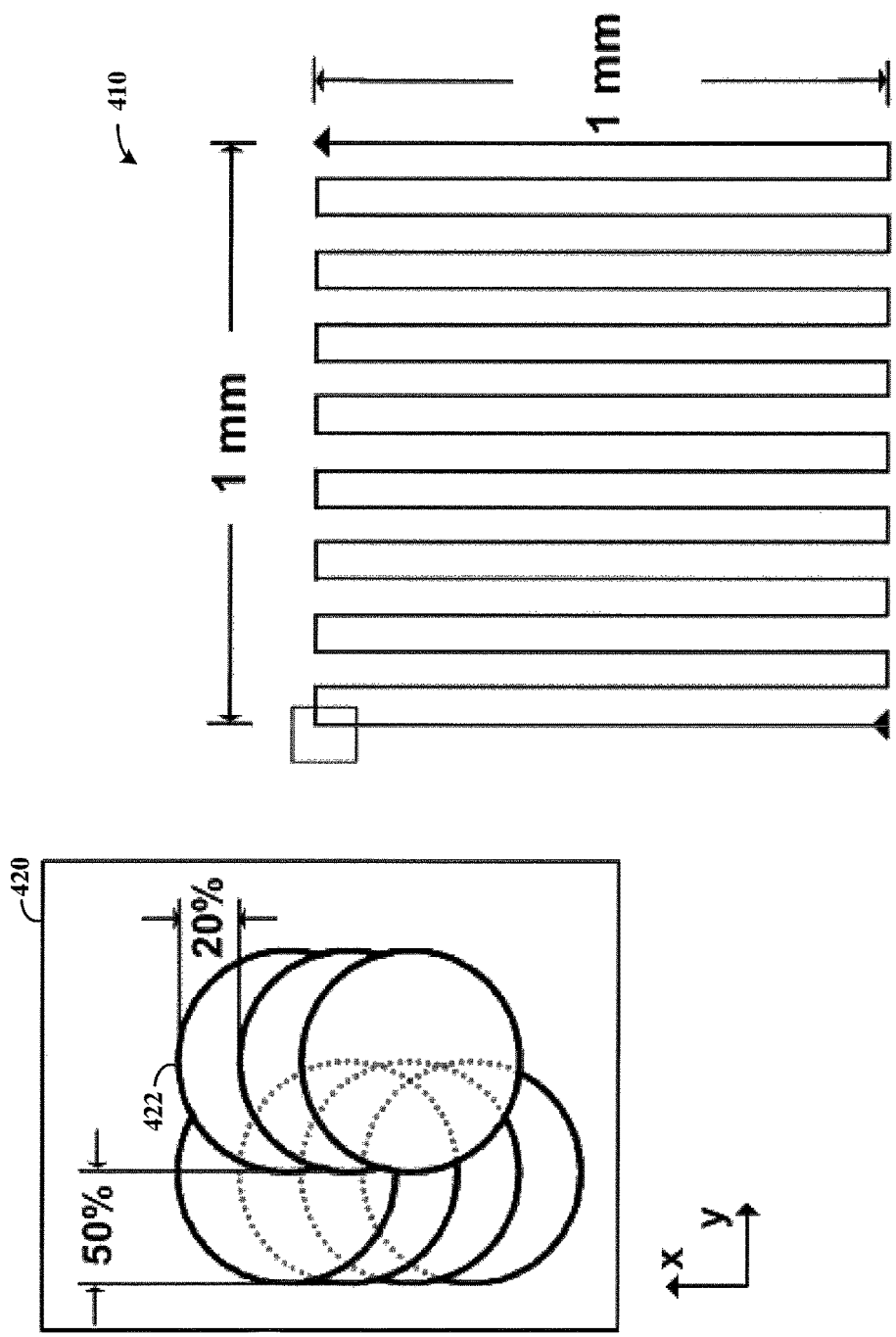
FIG. 4 shows a scanning approach for reducing a height of surface asperities, in accordance with one or more example embodiments.

The application of energy pulses as described herein is carried out in a variety of manners, to suit respective embodiments. FIG. 4 shows a scanning approach for applying energy pulses and reducing a height of surface asperities, in accordance with one or more example embodiments. At 410, a scanning path is shown for a 1 mm×1 mm sample, with the path following the solid line in the direction of the arrows therein. The inset 420 shows a close-up view of parallel scanning paths as shown at 410, with a 50% overlap of the paths in the y direction, and an 80% overlap of the respective melt pools in the x direction. Each melt pool (melt pool 422 is labeled by way of example) is melted and solidified as discussed herein. Asperity reduction is effected in a first pass along the path as shown via thermocapillary flow having a high temperature gradient, reducing both low-frequency and high-frequency asperities. Asperities generated during the first pass are further reduced in a second pass using a lower temperature gradient and involving one or both of thermocapillary and capillary flow. This second pass may, for example, follow the same path as shown at 410, and use the same or different amount of overlap (and melt pool size) as shown at 420.

Figure 5:
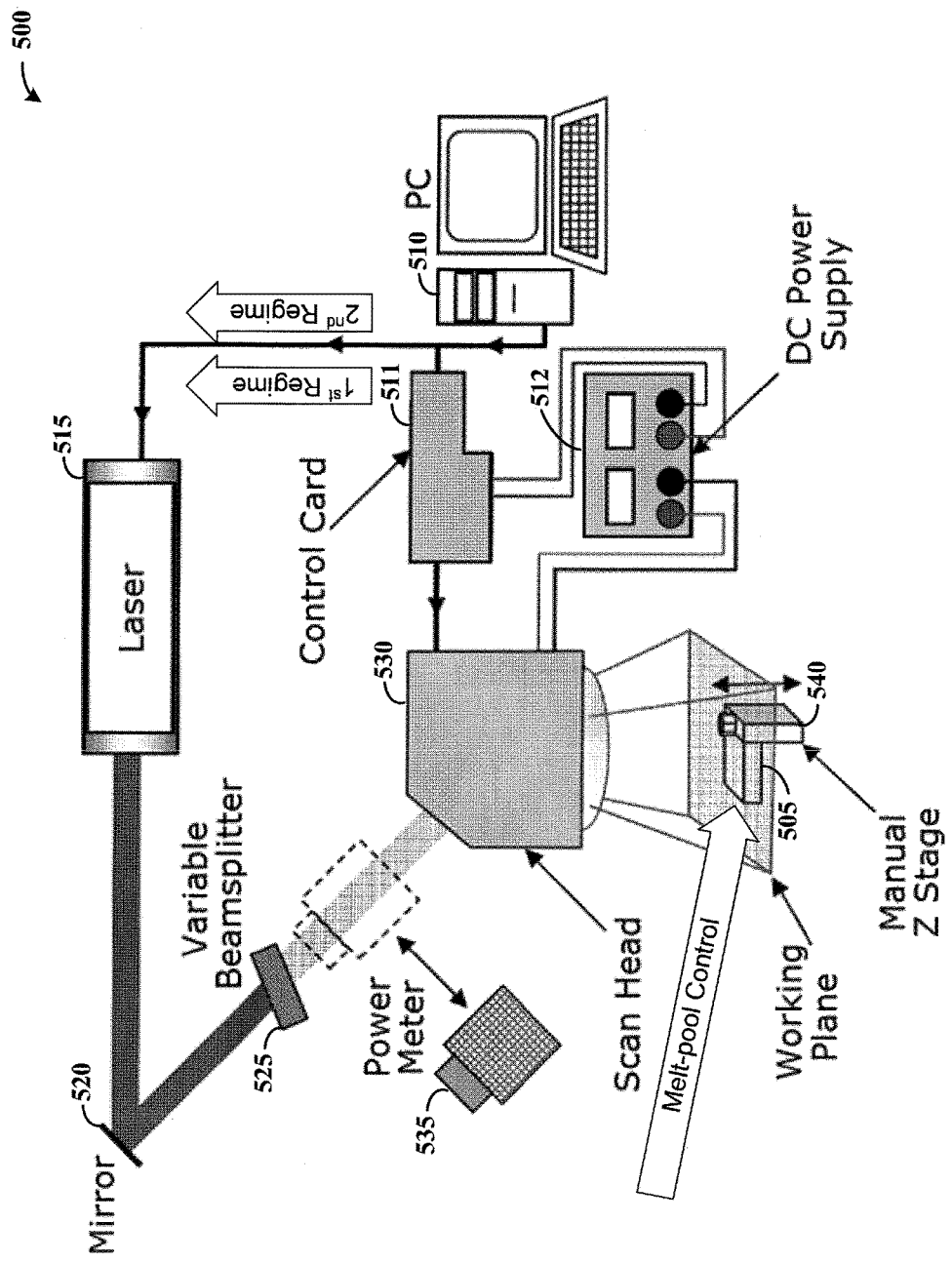
FIG. 5 shows an apparatus for reducing a height of surface asperities, in accordance with one or more example embodiments.

FIG. 5 shows an apparatus 500 for reducing a height of surface asperities, in accordance with one or more example embodiments. The apparatus 500 may, for example, be used in connection with the specific embodiments described in the following discussion, and/or with embodiments described above (e.g., in connection with the methods shown in FIGS. 1 and 2, in generating the melt pools in FIGS. 3A and 3B, and in implementing the scanning approach shown in FIG. 4).

The apparatus 500 includes a processor 510, control card 511 and power supply 512 that work (e.g., as a controller) to control and operate the application of laser pulses and generation of a melt pool in a workpiece 505. An energy pulse device implemented as a laser 515 is controlled to generate laser pulses under first and second regimes as discussed herein. The pulses are passed via a mirror 520, variable beamsplitter 525, and scan head 530 that scans the workpiece 505. A power meter 535 can be implemented to detect and provide feedback indicating the power of the applied beam. A stage 540 may also be implemented to move the workpiece 505 in the Z direction as shown, or in other directions to suit particular applications. Accordingly, one or both of the laser scanning and stage actuation can be used to control the application of the beam to the workpiece.

The apparatus 500 operates in the first regime by generating energy pulses to reduce a height of surface asperities in a surface region of the workpiece 505 by controlling characteristics (e.g., the melt pool) of the surface region (e.g., the melt pool), using the energy in the pulses. This melt pool flows material from both high-frequency and low-frequency surface asperities in the surface region. The apparatus 500 operates in the second regime by generating and using energy pulses to reduce a height of high-frequency surface asperities in the surface region, such as those that may be introduced during the first regime. Similarly, characteristics (e.g., the melt pool) of the surface region are controlled via the second energy pulses to flow material, from the surface region, that is predominantly from the high-frequency surface asperities. These second energy pulses are different than the first energy pulses, so as to effect a different temperature gradient and differently flow material in the melt pool (e.g., by flowing less or no material via thermocapillary flow, thus mitigating high-frequency asperities without introducing asperities via the flow and upwelling).

In some embodiments, the apparatus 500 is configured and arranged to independently modify two or more of power, pulse duration and pulse rate of the energy pulses. For example, the laser 515 can be controlled to apply pulses having two or more of different power, different duration and different rate (e.g., time between pulses), for each of the respective regimes. As may be implemented in connection with one or both of the independent power/duration application, one or more components in the apparatus 500 can be implemented to adjust other aspects of the applied pulses such as scan rate, beam size, and beam path.

The various discussion provided hereafter may relate to one or more experimental embodiments of the present invention. These experimental embodiments can be useful in that they provide several reference points and illustrative examples. Notwithstanding, the specifics of each experimental embodiment may not be required in (or even particularly relevant to) all embodiments of the present invention.

In accordance with an embodiment, the effects of laser pulse duration with the aid of pulse laser micro polishing (PLµP) experiments are carried out by three different pulse durations, 0.65 µs, 1.91 µs and 3.60 µs. To eliminate the effects of laser beam intensity distribution, the experiments are performed with approximately Gaussian beams. Evidence of Marangoni flows (also known as thermocapillary flows) at longer melt durations are recognized, and greater reduction in surface roughness is achieved than at shorter melt durations. Experiments are carried out on Ti6Al4V alloy surfaces produced using micro end milling. The cross sections of the polished region are imaged to measure the melt depth and the depth of the heat affected zone for each pulse duration, to observe their effects and to derive more knowledge about the process. Ti6Al4V can be used due to its wide applications in medical implants. Such experiments may, for example, be carried out with the system 500 shown in FIG. 5.

Micro end milling is used to face samples using a 2-flute, 1-mm-diameter tungsten-carbide (WC) tool (e.g., part SS-2-0394-S available from Performance Micro Tool of Janesville, Wis.) at a spindle speed of 40,000 rpm (e.g., model HES-510 high-speed spindle from NSK of Ann Arbor, Mich.) and 800 mm/min feed rate (e.g., a TM-1 3-axis CNC mill available from HAAS automation of Oxnard, Calif.) corresponding to a chipload of 10 µm. The chipload also corresponds to the wavelength of the features created on the surface. Water-based metal working fluid is used during this process, to produce an average surface roughness (for an evaluation area, of ~0.09 mm2) under these machining conditions of 205.1±14 nm and the area peak-to-valley height, of ~3.0 µm.

Two lasers of similar wavelength and intensity profiles, which can be used for experimentation include: (1) A 1064-nm-wavelength, 250 W (CW) neodymium-doped yttrium aluminum garnet (Nd:YAG) laser, and a 1070-nm-wavelength, 200 W (CW) fiber laser. The lasers are directed by static mirrors into a scan head to allow for high-speed, two-dimensional scanning at beam velocities of up to 1.5 m/s (e.g., using a hurrySCAN from Scanlab of St. Charles, Ill.). The scan head is controlled by a control card (e.g., ForeSight from LasX Industries of White Bear Lake, Minn.), with an f-theta objective having a focal length of 100 mm. A z-axis manual stage is used to adjust the laser beam diameter and to accommodate samples of varying thickness.

Figure 6:
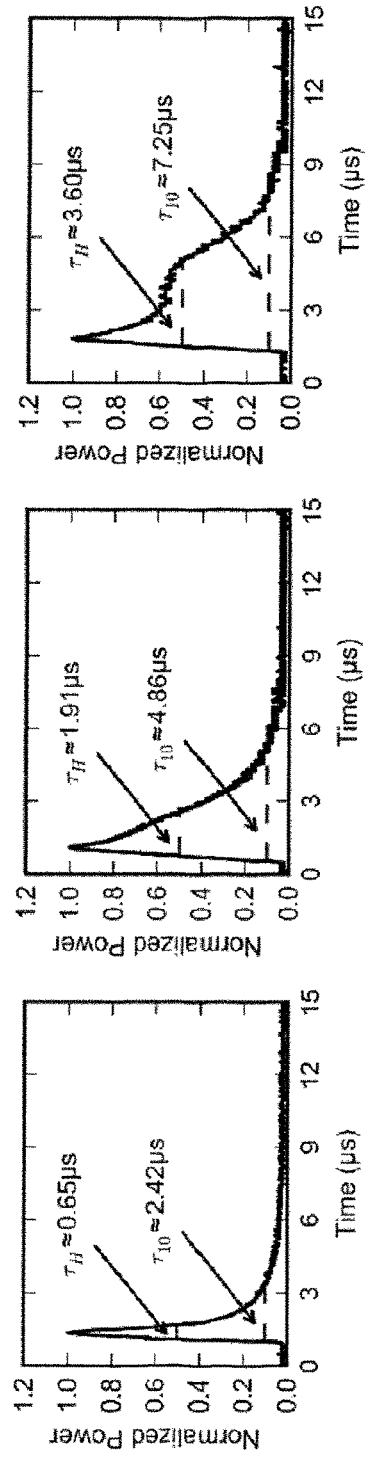
FIG. 6 shows temporal profile plots, in accordance with one or more example embodiments.

Temporal characteristics and pulse profiles of the fiber laser can be measured. To account for non-uniform temporal profiles, both the full-width-half-maximum pulse duration ($\tau_H$) and the 10% pulse duration ($\tau_{10}$) are measured, with $\tau_H$ being used for theoretical predictions. FIG. 6 shows (from left to right) plots of the temporal profile for ~0.65 µs pulses generated using the Nd:YAG laser in Q-switched mode at a pulse frequency of 4 kHz, and pulse profiles generated by the fiber laser with pulse durations of ~1.91 µs and ~3.60 µs at frequencies of 40 kHz and 25 kHz, respectively. Different pulse frequencies are used to achieve desired pulse durations. The temporal pulse profiles are measured at different time instances and are stable (e.g., with less than about 10% error). The power for PLμP is varied using an external beam splitter to ensure no variation of temporal pulse profiles with the commanded laser power.

The beam intensity profiles are measured for the two laser sources, with the measured focal beam diameter for the Nd:YAG laser being ~85 μm and that for the fiber laser being ~30 μm. The intensity distribution for both the lasers is close to Gaussian distribution.

Figure 7:
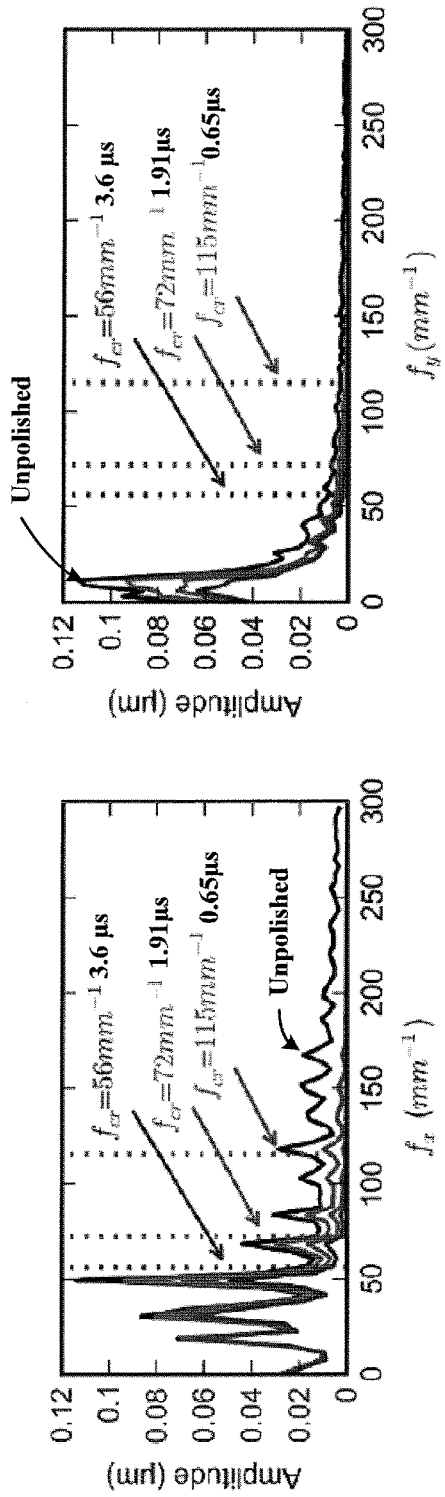
FIG. 7 shows overlaid plots of predicted spatial spectra after pulsed laser micro polishing, in accordance with one or more example embodiments.

The surface finish can be predicted using an approach such as that shown in FIG. 2, with Table 1 showing predicted melt durations and critical frequencies, and Table 2 showing predicted polished roughness and percentage reductions in the average surface roughness for the three pulse durations. FIG. 7 shows overlaid plots of predicted spatial spectra after PLμP for the three pulse durations and an unpolished surface, for x-spectra (left) and y-spectra (right).

TABLE 1

| Pulse duration (μs) | Maximum melt duration, $t_{m-max}$ (μs) | Critical frequency, $f_{cr}$ (mm$^{-1}$) |
|---|---|---|
| 0.65 | 1.164 | 115 |
| 1.91 | 2.980 | 72 |
| 3.60 | 4.982 | 56 |

TABLE 2

| Pulse duration (μs) | $S_a$- Unpolished (nm) | $S_a$- Predicted (nm) | Reduction in $S_a$ (%) |
|---|---|---|---|
| 0.65 | 193.9 | 138.0 | 18.6 |
| 1.91 | 211.6 | 127.5 | 39.7 |
| 3.60 | 206.5 | 94.4 | 54.3 |

Example pulsed laser polishing parameters are as follows:

| 0.65 μs | Type of laser | 250 W CW Nd:YAG |
| | Pulse frequency (kHz) | 4 |
| | Melt pool dia. (μm) | ~56 |
| | Scan speed(mm/s) | 30 |
| | Average power (W) | 0.46 ± 0.03 |
| | Energy per pulse (mJ) | 0.115 ± 0.008 |
| | Melt duration (ns) | 1164 |
| | Critical frequency (mm$^{-1}$) | 115 |
| 1.91 μs | Type of laser | 200 W CW/Modulated Fiber Laser |
| | Pulse frequency (kHz) | 40 |
| | Melt pool dia. (μm) | ~27 |
| | Scan speed(mm/s) | 150 |
| | Average power (W) | 3.88 ± 0.05 |
| | Energy per pulse (mJ) | 0.097 ± 0.001 |
| | Melt duration (ns) | 2980 |
| | Critical frequency (mm$^{-1}$) | 72 |
| 3.60 μs | Type of laser | 200 W CW/Modulated Fiber Laser |
| | Pulse frequency (kHz) | 25 |
| | Melt pool dia. (μm) | ~27 |
| | Scan speed(mm/s) | 100 |
| | Average power (W) | 3.16 ± 0.02 |
| | Energy per pulse (mJ) | 0.126 ± 0.001 |
| | Melt duration (ns) | 4982 |
| | Critical frequency (mm$^{-1}$) | 56 |

For each pulse duration, a variation of laser power is carried out to select the power that results in high or the highest reduction in surface roughness. The laser beam is scanned to follow a zig-zag (raster) pattern over an area of 1 mm×1 mm, such as shown in FIG. 4. The laser scan speed is chosen so that spot overlap is approximately 80% of the melt pool diameter. The line overlap of the raster is chosen to be approximately 50% of the melt pool diameter. The polishing can be carried out in an inert environment, created by a jet of argon flowing parallel to the sample surface, to minimize oxidation and cracking of Ti6Al4V alloy. The polishing may also be carried out in another inert environment, in air, or in a vacuum.

Table 3 shows example results of PLμP, in which average roughness reductions up to about 70% are achieved on the samples.

TABLE 3

| Pulse duration (μs) | $S_a$- Unpolished (nm) | $S_a$- Polished (nm) | Reduction in $S_a$ (%) |
|---|---|---|---|
| 0.65 | 193.9 | 152.4 | 21.3 |
| 1.91 | 211.6 | 66.5 | 68.6 |
| 3.60 | 206.5 | 57.0 | 72.4 |

Interferometry can be used to image surface height data for such polished (and unpolished) regions. Surface spikes that are an artifact of the measurement can be removed via software, and low frequencies corresponding to waviness can be filtered using a high pass Gaussian filter with cut-off wavelength, 0.08 mm (of 12.5 mm-1). Significant reduction in the amplitudes of the frequency components can be achieved, at 1.9 μs and 3.6 μs pulse durations. Spectra for all the three polishing conditions effectively remove the high spatial frequency (>100 mm-1) components. The amplitudes of the low spatial frequency components (25-100 mm-1) polished at 1.91 μs and 3.60 μs are smaller than the corresponding amplitudes polished at 0.65 μs.

The melt zone and heat affected zone (HAZ) are measured by cutting samples across the polished region, mounting and mechanically grinding the samples. Final polishing can be done using a 3 μm diamond particle paste on nap cloth. The mechanically polished cross sections are ultrasonically cleaned in ethanol for 1 min followed by chemical etching with a solution of ammonium bifluoride (NH4HF2) for 1 min. The etched cross sections are observed under an optical microscope, at 500× magnification. Such cross sections may, for example, be represented as shown in FIGS. 3A and 3B. In addition, for 0.65 μs polishing, longer pulse durations result in deeper melt pools as there is no clear distinction between the melt zone and the HAZ. Table 4 shows example melt depths, HAZ thicknesses and melt pool diameters, as may be achieved in connection with one or more example embodiments:

TABLE 4

| Pulse duration (µs) | Melt Depth (µm) | HAZ thickness (µm) | HAZ Depth (µm) | Melt pool dia. (µm) |
|---|---|---|---|---|
| 0.65 | * | * | 2.5 | 56 |
| 1.91 | 4.2 | 8.3 | 12.5 | 27 |
| 3.60 | 5.5 | 7.9 | 13.4 | 27 |

Table 5 shows spatial frequencies corresponding to features, relative to a number of laser pulses incident per mm in the scanning direction and line overlap in the scanning pattern (e.g., as in FIG. 4). The spatial frequencies corresponding to these features are calculated for each case based on the processing parameters shown above.

TABLE 5

| | Spatial frequency ($mm^{-1}$) | |
|---|---|---|
| Pulse duration (µs) | pulses/mm | Lateral overlap |
| 0.65 | 133.33 | 83.3 |
| 1.91 | 266.7 | 77 |
| 3.60 | 250 | 77 |

The introduction of additional features, as may be demonstrated by surface ripples in cross-section, is suggestive of the presence of thermocapillary flows (i.e., Marangoni flow). The frequency of this ripple corresponds to additional features observed in the spatial frequency spectra. The cross sections also suggest a flow pattern of the molten fluid, moving outwards from the center of the molten pool, resulting in the additional spatial features at the boundary of each melt pool. The formation of such surface ripples is a confirmation of Marangoni flows for materials with surface tension that decreases with increasing temperature. Table 6 shows experimental versus theoretical roughness:

TABLE 6

| Pulse duration (µs) | Experimental $S_a$ (nm) | Theoretical $S_a$ (nm) |
|---|---|---|
| 0.65 | 152.4 | 138.0 |
| 1.91 | 66.5 | 127.5 |
| 3.60 | 57.0 | 94.4 |

The Marangoni convection is driven by the temperature gradient of surface tension, and the steep gradient of the laser beam intensity distribution can be used to generate a temperature gradient in the melt pool, with thermocapillary flows dominating for longer melt durations (e.g., 1.91 µs and 3.60 µs as used herein).

In accordance with one or more embodiments, these pulse durations can be used to effect dominant thermocapillary flows via one or both of resistance to fluid flow and long melt durations. Resistance to fluid flow (viscous forces) decreases with deeper melt pools, caused by longer pulse durations. The surface tension forces resulting from temperature gradients in the melt pool can overcome the reduced viscous forces resulting in thermocapillary flows. Longer melt durations provide sufficient time for a greater volume of molten metal to flow from the center to the outer edge of the melt pool before resolidification.

The forces that create thermocapillary (e.g., Marangoni) flow can be achieved when sufficient temperature gradients exist on the surface of a melt pool and the material's surface tension is temperature-dependent. Whether or not the flow (displacement of material) is deemed significant can depend upon the application. Using these approaches, resulting ripples can be of sufficiently small amplitude such that the resulting smoothing on melt pool can result in in lower average surface roughness. Further, these approaches can be carried out without liquid-solid separation at the edge of the melt pool, mitigating undercutting in the formation of the ripples. The pulsed laser polishing can be done in the absence of ablation (melting only); therefore, the effect of vapor pressure on melt pool deformation and flow can be ruled out.

Operating in the thermocapillary regime at longer pulse durations can be used to achieve greater than 70% reduction in the surface roughness. Thermocapillary flows introduce higher frequency spatial features on the surface and attenuate much lower frequency components than pulsed laser polishing at shorter pulse durations. Within the range of parameters studied, the resulting surface is smoother in the presence of thermocapillary flows because of the relatively low amplitude of the features that are created. These features can be subsequently reduced via capillary flow.

It has been recognized that surface features of wavelengths greater than the diameter of the melt pool cannot be attenuated or are difficult to attenuate when surface tension forces dominate (e.g., when body forces such as gravity are negligible). The critical wavelength corresponding to 3.60 µs is 18 µm as discussed herein is of the same scale as the beam diameter of 27 µm. Accordingly, increasing the pulse duration any further for this laser beam diameter may not further improve the surface finish. However, the critical spatial frequency concept may not be valid for the 3.60 µs pulse duration discussed herein, with thermocapillary flow.

In connection with these experimental (and other) approaches, surprising/unexpected results were recognized in that the experimental roughness reduction was much higher than those predicted in the cases of 1.91 µs polishing and 3.60 µs polishing, as can be exemplified via two-dimensional spatial frequency spectra, and that additional features are introduced in high frequency regions corresponding to the number of laser pulses per mm. Thermocapillary flows were confirmed, via surface ripple at the same frequency as the number of laser pulses per mm. Accordingly, Marangoni flows are implemented in PLµP process, to achieve up to and/or exceeding 70% reduction in asperities at longer pulse durations. Additional high frequency spatial features that are introduced on the surface during this approach are of relatively small amplitude, and low frequency components are significantly attenuated, resulting in low surface roughness. Further flow (e.g., Marangoni flow at lower temperature gradients, or capillary flow) can be used to attenuate the introduced high frequency spatial features.

Various embodiments as described herein may be implemented with circuit-based components that carry out one or more of the operations and activities described herein and/or shown in the figures. For example, one or more of the above-discussed embodiments are carried out with discrete logic circuits or programmable logic circuits that implement the respective operations/activities, such as in one or more components shown in FIG. 5. In certain embodiments, one or more computer circuits is programmed to execute a set (or sets) of instructions (and/or configuration data) that, when executed, cause the appropriate method to be carried out. The instructions (and/or configuration data) can be in the form of firmware or software stored in and accessible from a memory (circuit). In one example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Various embodiments described above and shown in the figures may be implemented together and/or in other manners. One or more of the items depicted in the drawings/figures herein can also be implemented in a more separated or integrated manner, or removed and/or rendered as inoperable in certain cases, as is useful in accordance with particular applications. For example, asperities in different types of material can be reduced using the various approaches as described herein. As another example, different manners in which to control the flow of material in melt pools as described herein can be combined or used separately. In view of this and the description herein, those skilled in the art will recognize that many changes may be made thereto without departing from the spirit and scope of the present invention.

What is claimed is:

1. A method comprising:
   reducing a height of surface asperities in a material surface region having both high-frequency surface asperities and low-frequency surface asperities, by controlling characteristics of the surface region under a first regime to flow material from the surface asperities; and
   reducing a height of high-frequency surface asperities in the material surface region by controlling characteristics of the surface region under a second regime to flow material that is predominantly from the high-frequency surface asperities, the controlled characteristics in the second regime being different than the controlled characteristics in the first regime.

2. The method of claim 1, wherein
   reducing the height of the surface asperities under the first regime includes reducing the height of both high-frequency and low-frequency surface asperities by iteratively generating and solidifying melt pools at different portions of the material surface region; and
   reducing the height of the high-frequency surface asperities under the second regime includes reducing a height of high-frequency surface asperities generated by the iterative generation and solidification of the melt pools under the first regime, by iteratively generating and solidifying additional melt pools in the material surface region.

3. The method of claim 1, wherein
   controlling characteristics of the surface region under the first regime includes setting a first temperature gradient at the surface region and using the first temperature gradient to heat and promote the material flow; and
   controlling characteristics of the surface region under the second regime includes setting a second temperature gradient at the surface region, the second temperature gradient being different than the first temperature gradient, and using the second temperature gradient to heat and promote the flow of the material that is predominantly from the high-frequency surface asperities.

4. The method of claim 1, wherein
   controlling characteristics of the surface region under the first regime includes generating and using first energy pulses to flow the material; and
   controlling characteristics of the surface region under the second regime includes generating and using second energy pulses that are different than the first energy pulses, to flow the material that is predominantly from high-frequency surface asperities generated under the first regime, while leaving material that predominantly corresponds to low-frequency surface asperities.

5. The method of claim 4, wherein at least one of generating and using the first energy pulses and generating and using the second energy pulses includes applying energy pulses to a portion of the surface region to
   generate a melt pool in the surface region during the application of each energy pulse, and
   solidify the melt pool during a period between each energy pulse.

6. The method of claim 5, wherein generating a melt pool in the surface region during the application of each energy pulse includes
   for the first energy pulses, maintaining the melt pool for a first time period by applying pulses of a first duration, and
   for the second energy pulses, maintaining the melt pool for a second time period that is different than the first time period, by applying pulses of a second duration that is different than the first duration.

7. The method of claim 5, wherein generating and using the first energy pulses includes generating and using energy pulses at first duty cycle and first repetition rate that maintain the melt pool for a first time period; and
   generating and using the second energy pulses includes generating and using energy pulses at a second duty cycle and second repetition rate that are different than the first duty cycle and first repetition rate, and that maintain the melt pool for a second time period that is different than the first time period.

8. The method of claim 7, wherein the steps of generating and using first and second energy pulses respectively include generating heat pulses with a laser operated at the respective duty cycles and repetition rates.

9. The method of claim 4, wherein generating and using the first energy pulses includes generating and using energy pulses that are different than the second energy pulses in at least one of: duty cycle and repetition rate, power, pulse duration, time between pulses, and intensity distribution of the energy pulses in the surface region.

10. The method of claim 4, wherein
    generating and using the first energy pulses includes using the first energy pulses to set a first surface tension condition that varies along the surface region, and using the first surface tension condition to promote the flow of the material; and
    generating and using the second energy pulses includes using the second energy pulses to set a second surface tension condition that varies along the surface region, the second surface tension condition being different than the first surface tension condition, and using the second surface tension condition to promote the flow of the material.

11. The method of claim 4, wherein generating and using at least one of the first and second energy pulses includes generating energy pulses based upon a type of surface feature in the surface region, and using the energy pulses to reduce a height of surface features of the type in the surface region.

12. The method of claim 1, wherein
controlling characteristics of the surface region under the first regime includes setting a first surface tension condition that varies along the surface region and using the first surface tension condition to promote the flow of the material under the first regime; and
controlling characteristics of the surface region under the second regime includes setting a second surface tension condition that varies along the surface region, the second surface tension condition being different than the first surface tension condition, and using the second surface tension condition to promote the flow of the material under the second regime.

13. The method of claim 12, wherein at least one of setting a first surface tension condition and setting a second surface tension condition includes using a dopant at the surface region to set the surface tension condition.

14. The method of claim 12, wherein at least one of setting a first surface tension condition and setting a second surface tension condition includes using a surface-active agent located at a surface of the surface region, to set the surface tension condition.

15. The method of claim 1, wherein reducing a height of surface asperities and reducing a height of high-frequency surface asperities include reducing the height of surface asperities while removing substantially none of the material in the surface regions.

16. A method comprising:
reducing a height of both high-frequency surface asperities and low-frequency surface asperities in a surface region of a material, by
applying first energy pulses to generate melt pools in the surface region and to promote thermocapillary flow of the material from the surface asperities in the melt pools, and
via the thermocapillary flow, generating additional high-frequency asperities near edges of the melt pools as the melt pools solidify; and reducing a height of the additional high-frequency asperities under a second regime by applying second energy pulses to generate melt pools in the surface region and to promote at least one of thermocapillary flow and capillary flow of the material from the additional high-frequency asperities, the second energy pulses being different from the first energy pulses.

17. The method of claim 16, wherein
applying the first energy pulses includes generating melt pools having a highest temperature at a center portion thereof and a first temperature gradient extending from the center portion to an edge of the melt pool,
generating the additional high-frequency asperities includes upwelling material via the thermocapillary flow as the melt pools resolidify in each of a plurality of overlapping regions in the surface material, each region corresponding to one of the energy pulses, and
applying the second energy pulses includes
generating melt pools having a second temperature gradient from a center portion to an edge thereof that is smaller than the first temperature gradient and that mitigates upwelling of the material,
flowing the material from the additional high-frequency asperities in the melt pools, and
using viscous characteristics of the material to damp oscillations of the material in the melt pools as the melt pools resolidify.

18. The method of claim 17, wherein
applying the first energy pulses includes generating and maintaining the melt pools for a first duration before resolidifying the melt pools, the first duration being sufficient to reduce a majority of the height of the high and low frequency asperities to smooth a surface of the surface region, and
applying the second energy pulses includes generating and maintaining the melt pools for a second duration before resolidifying the melt pools, the second duration being different than the first duration and sufficient to reduce a majority of the height of the additional high-frequency asperities to additionally smooth the surface of the surface region.

* * * * *

UNITED STATES PATENT AND TRADEMARK OFFICE
CERTIFICATE OF CORRECTION

PATENT NO. : 10,315,275 B2
APPLICATION NO. : 13/749426
DATED : June 11, 2019
INVENTOR(S) : Vadali et al.

Page 1 of 1

It is certified that error appears in the above-identified patent and that said Letters Patent is hereby corrected as shown below:

In the Specification

Column 1, Paragraph 1 currently reads:
This invention was made with government support under 090004 awarded by the National Science Foundation. The government has certain rights in the invention.

Should read:
This invention was made with government support under 0900044 awarded by the National Science Foundation. The government has certain rights in the invention.

Signed and Sealed this
Eighth Day of October, 2019

Andrei Iancu
*Director of the United States Patent and Trademark Office*